United States Patent [19]

Kraper

[11] Patent Number: 5,004,252
[45] Date of Patent: Apr. 2, 1991

[54] SHOPPING BASKET ACCESSORY

[76] Inventor: Wayne Kraper, 775 Springwood St., "A", Corona, Calif. 91720

[21] Appl. No.: 383,640

[22] Filed: Jul. 24, 1989

[51] Int. Cl.[5] .......................... B62B 3/02; B62B 5/00
[52] U.S. Cl. ...................... 280/33.992; 280/DIG. 4; 40/308; 108/42; 248/240
[58] Field of Search ....................... 280/33.991, 33.992, 280/33.994, 33.996, FIG. 4; 40/308; 108/42, 46, 47; 248/240, 240.1, 240.4

[56] References Cited

U.S. PATENT DOCUMENTS

| | | | |
|---|---|---|---|
| 1,850,599 | 3/1932 | Milner | 108/46 X |
| 2,236,717 | 4/1941 | Noack | 248/240.4 |
| 2,296,028 | 9/1942 | Gribble | 108/46 X |
| 2,845,729 | 8/1958 | Baumgart | 280/33.992 X |
| 2,888,761 | 6/1959 | Miller | 280/33.992 X |
| 3,125,040 | 3/1964 | Roberson | 108/47 X |
| 3,251,543 | 5/1966 | Bush et al. | 280/33.992 X |
| 3,912,291 | 10/1975 | Frisch | 280/33.992 |
| 3,993,319 | 11/1976 | Day | 280/33.992 |
| 4,156,318 | 5/1979 | Economy | 208/33.992 X |
| 4,274,567 | 6/1981 | Sawyer | 280/33.992 X |
| 4,361,340 | 11/1982 | Soriano | 280/33.992 |
| 4,583,753 | 4/1986 | Economy | 280/33.992 |
| 4,643,280 | 2/1987 | Hensley | 280/33.992 X |

FOREIGN PATENT DOCUMENTS 2176332 12/1986 United Kingdom ........... 280/33.992

*Primary Examiner*—Andres Kashnikow
*Assistant Examiner*—Brian L. Johnson
*Attorney, Agent, or Firm*—Walter A. Hackler

[57] ABSTRACT

A shopping basket accessory includes a partition for covering a bin area of a conventional shopping cart and for providing a solid writing surface proximate the handle on the conventional shopping cart. A partition is mounted on a generally vertical divider disposed within the conventional shopping cart for enabling the partition to be stored in the generally parallel relationship on either side of the divider and lifted to a position extending between the divider and the shopping cart handle.

6 Claims, 2 Drawing Sheets

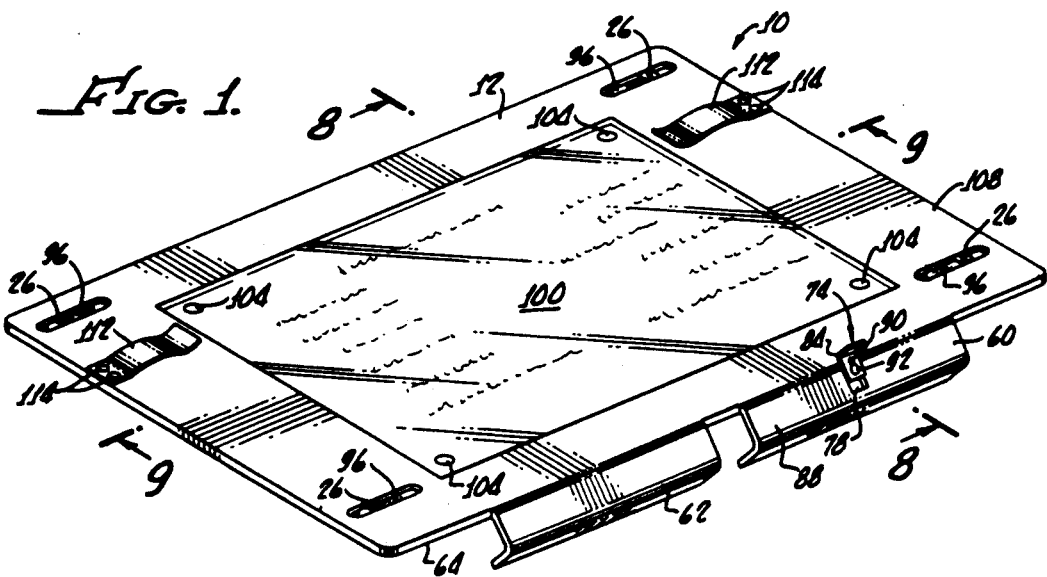
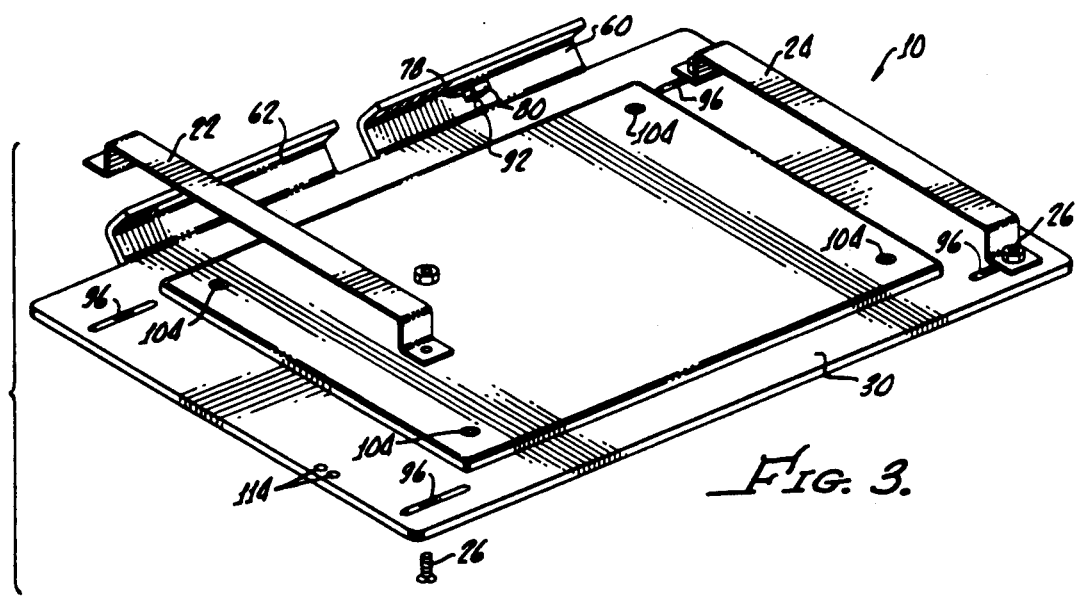
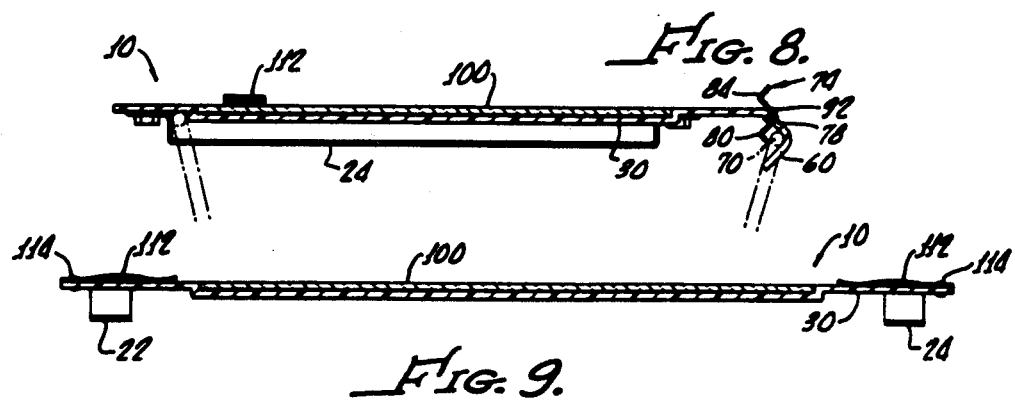

SHOPPING BASKET ACCESSORY

The present invention is generally directed to improvements in shopping baskets and is more particularly directed to a shopping basket accessory for providing both security and convenience to market customers for the writing of checks, the display of store directories, and the handling of store coupons.

A conventional wire shopping basket adapted for being nested within one another for compact storage within a store prior to use is well known to most shoppers in modern day super markets and the like. Such baskets conveniently include a divider disposed within the wire basket which is movable to a spaced apart position from a handle to define, in combination with a wire bottom connected thereto, an elevated bin within the wire basket proximate the handle. A shopper typically places large items in the bottom of the basket and small items in the elevated bin, which also provides a convenient spot for the carrying of a shopper's purse, or the like.

While providing convenience to the shopper, conventional shopping baskets in many instances prove awkward to shoppers who find themselves in a position of writing a check, or the like, while in a checkout line. When the elevated bin is filled with groceries and/or a purse, there is no convenient support surface for a customer to initialize the writing of a check prior to reaching the checkout stand. In addition, during shopping, there is no convenient holding device in the conventional basket for store coupons, or the like. Further, in many stores, there is no overall directory but only a number of isle directories, which require a shopper unfamiliar with the store to walk from one end to the other in order to find an isle having the item desired.

In some instances, the unprotected storage of a purse in the upper bin provides an irresistible lure for purse snatching, particularly when the shopper is a few steps from the basket.

Hence, there is a need for an improved shopping basket, or shopper basket accessory which can be attached to conventional baskets which provides a secure compartment for the storage of a purse during shopping, a flat surface for the writing of checks and, in addition, an area where a full store directory may be displayed for the shopper's convenience along with a place to display store specials and a convenient holding system for store coupons. The present invention is directed to and satisfies the hereinabove recited needs.

SUMMARY OF THE INVENTION

In accordance with the present invention, a shopping basket accessory includes partition means for covering a bin area of a conventional shopping cart and for providing a solid writing surface proximate a handle on the conventional shopping cart. In addition, means are provided, mounting the partition means to a movable generally vertical divider disposed within the conventional shopping cart, for enabling the partition means to be stored in a parallel relationship with the divider and lifted to a position extending between the divider and the shopping cart handle. By way of improvement, the present invention is suitable for a shopping basket having a handle, wheel mounted wire basket and generally vertical wire divider disposed within the wire basket and movable to a spaced apart position from the handle to define, in combination with the wire bottom connected thereto, an elevated bin within the wire basket proximate the handle.

In this manner, the partition means of the present invention is mounted to enable conventional nesting of the shopping basket wherein the vertical divider is rotated to a generally horizontal position as the baskets are nested.

Importantly, the partition member of the present invention includes bracket means which are disposed on a back side thereof for enabling the partition means to slide in a generally vertical direction relative to the divider from a storage position at which the partition means is on a front side of the separation member to a storage position at which the partition means is on the back side of the divider. This feature enables the movement of the partition means from the storage position to a position extending between the divider and the shopping cart handle, despite the loading of the elevated bin by groceries or purse. Hence, the use of the present invention on a conventional shopping cart does not inhibit the otherwise usable storage space in any manner during the selection of goods, yet is available for use to the shopper in providing a writing or support surface after the shopping cart is filled with goods.

More particularly, the partition means in accordance with the present invention may include a depending member disposed on a forward edge thereof and shaped for partially encircling a basket wire proximate the handle. Latch means may be provided which enables the present invention to provide a secure bin proximate the handle for temporary storage of the purse, or the like. The latch means may comprise a tab slidably mounted to the depending member and extending therethrough, with the tab having a lower portion shaped for partially encircling the basket wire proximate the handle when the tab is slid into a locked position. An upper portion of the tab, accessible from a top side of the depending means, enables the sliding of the lower portion into the locked position. When locked into position, a partition member deters for snatching which can more easily occur from an open shopping basket bin.

To provide further shopping convenience, the shopping basket accessory according to the present invention may include transparent means releasably mounted on a top side of the partition means under which a store directory, or the like, may be displayed. Further, means may be provided for temporarily holding store coupons, and the like, to the partition means to facilitate reference thereto by the shopper and prevention of mingling of such coupons, with purchased items as they are placed in the shopping basket.

BRIEF DESCRIPTION OF THE DRAWINGS

A better understanding of the present invention may be had from the consideration of the following detailed description, taken in conjunction with the accompanying drawings, in which:

FIG. 1 is a perspective view of a top side of the present invention generally showing a partition member and a member depending therefrom for engaging a conventional wire shopping basket;

FIG. 3 is a perspective view of a bottom side of the present invention generally showing means for mounting the partition to a conventional shopping cart;

FIG. 8 is a cross—sectional view of the present invention taken along the line 8—8 of FIG. 1, generally showing a latch mechanism for locking the partition to a shopping basket to provide a secure bin thereunder; and FIG. 9 is a cross section front view of the present invention taken along the line 9—9 of FIG. 1, generally showing a display area and clips for the holding of store coupons and the like.

DETAILED DESCRIPTION

Figure 2:
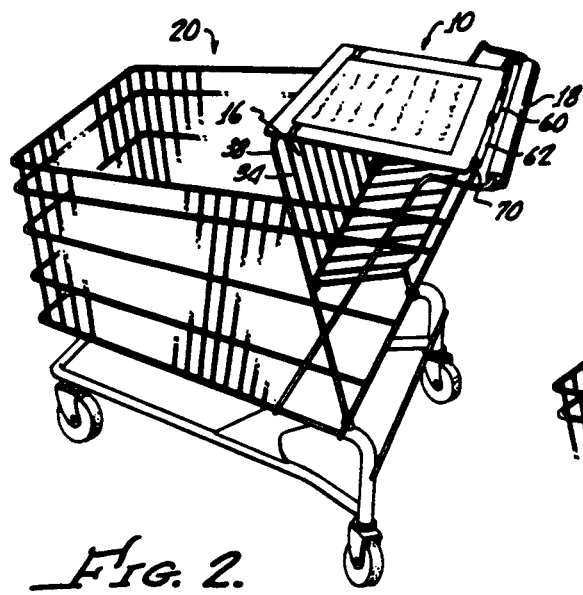
FIG. 2 is a perspective view of the invention as installed on a shopping cart and positioned in between a generally vertical moving member and a handle of the shopping cart to provide both a writing surface and a secure bin thereunder.

Turning now to the drawings, wherein like reference numerals or characters refer to identical or corresponding parts throughout the several views, there is shown in FIGS. 1 and 2 a shopping basket accessory 10 in accordance with the present invention, generally showing a partition 12 which provides means for covering a bin area 16 and for providing a solid writing surface proximate a handle 18 of a conventional shopping cart 20.

As more clearly shown in FIG. 3, a pair of brackets 22, 24 may be screw 26 mounted to an underside 30 of the partition 12 provide means for enabling the partition 12 to be stored in a parallel relationship with a divider 34. The partition 12 is attached to the divider 34 with a wire frame 38 thereof extending between the brackets 22, 24 and the underside 30 of the partition 12.

Figure 4:
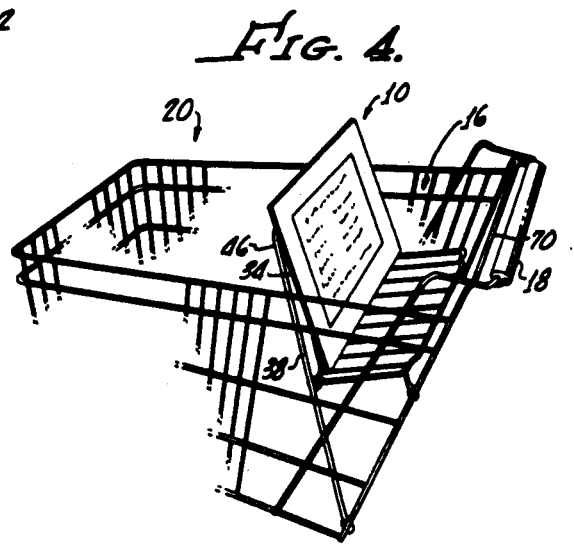
FIG. 4 and FIG. 5 are partial perspective views of the present invention showing storage positions of the partition within a shopping basket.
Figure 5:
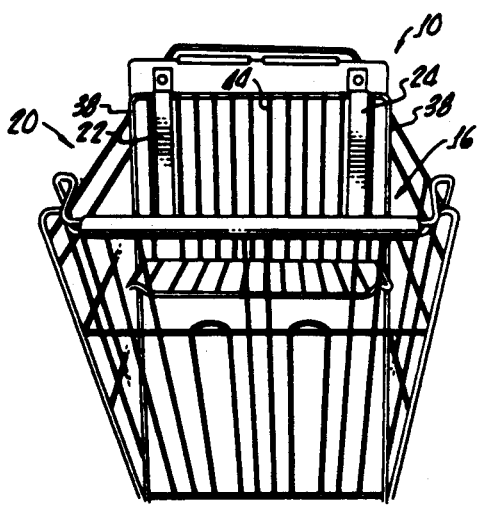
Figure 6:
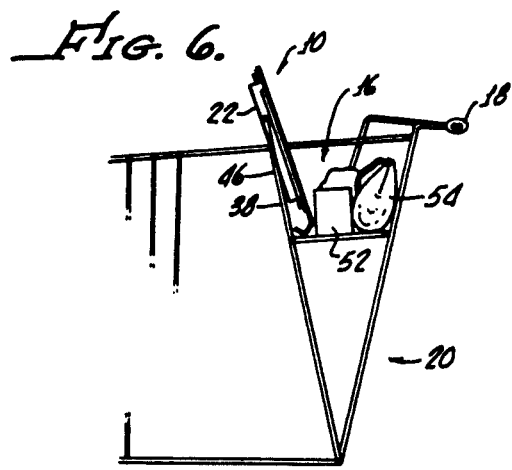
FIG. 6 is a cross-sectional view of the present invention as may be moved from a storage position to a usable position with goods in an elevated bin of the shopping basket.

As shown in FIGS. 4, 5 and 6, the brackets 22, 24 enable the partition 12 to slide in a generally vertical direction relative to the divider 34 from a storage position at which the partition 12 is on a front side 44, see FIG. 5, to a back side 46, see FIG. 4. Importantly, this sliding motion is not inhibited by goods 52 or a purse 54 disposed in the bin 16, see FIG. 6.

The partition may be formed from any suitable material such as plastic or metal and may include depending portion 60, 62, both disposed along a forward edge 64, which are shaped for partially encircling a basket wire 70 proximate the handle 18. This structure enables a positive positioning of the partition 12 between the divider 34 and the handle 18 in order that it is not accidentally dislodged by placing objects thereon or by translational movements thereof during its support of a checkbook, or the like (not shown). As can be seen in FIGS. 1 and 2, the structure depending portions 60, 62 requires the partition 12 to be slid toward the handle and raised upward in order to slide it into a storage position.

Figure 7:
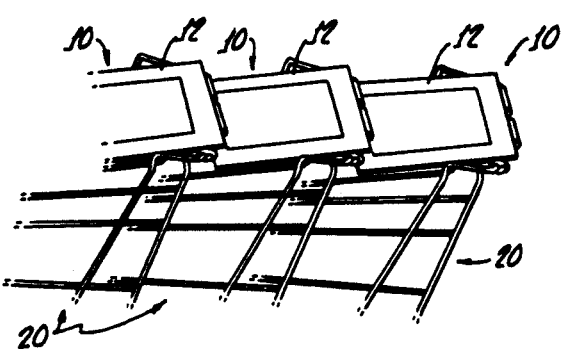
FIG. 7 is a partial perspective view showing the conventional nesting of shopping baskets without interference by the present invention.

As is shown in FIG. 7, the brackets 22, 24 enable the storage of the partition 12 in a position generally parallel to the divider 34 without interfering with the nesting of carts 20 for storage.

Turning now to FIGS. 8 and 9, a latch or tab 74 slidably mounted on the depending member 60 provides means for temporarily locking the partition 12 between the divider 34 and the handle 18. Tab 74 extends through an opening 78 and includes a lower portion 80 which is shaped for partially encircling the basket wire 70 when the tab 74 is slid to a locked position.

In the locked position, the basket wire 70 is totally encircled by the combination of the tab lower portion 80 and the depending member 60. An upper portion 84, accessible from a top 88, provides means for enabling the sliding of the lower portion 60 into the locked position, as most clearly shown in FIG. 8. The sliding of motion is enabled by a slot 90 in the tab upper portion 84 which is guided by a pin 92 therethrough.

Turning again to FIGS. 1 and 3, slots 96 disposed in the partition provide means for enabling the installation of the partition 12 on conventional shopping baskets 20 having different widths or different wire divider 34 configurations.

A transparent member, or window, 100 may be screw, or clip, 104 mounted to a top 108 of the partition 12 enables a store directory or sales brochures to be slipped thereunder so that they may be viewed by a shopper when the partition 12 is in position between the divider 34 and the handle 18 as shown in FIG. 2.

In addition, clips 112 may be molded into the partition 12 or attached thereto by rivets 114, or the like, in order to provide means for holding store coupons, or the like, for the shopper.

When the partition 12 is in a locked position between the divider 34 and the handle, a more secure bin is provided as can be seen from FIG. 2, which prevents a deterrent to purse snatching.

Although there has been hereinabove described a specific arrangement of a shopping basket accessory an improvement to conventional shopping baskets, in accordance with the present invention, for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention, as defined in the appended claims.

What is claimed is:

1. A shopping basket accessory comprising:

partition means for covering a bin area of a conventional shopping cart and for providing a solid writing surface proximate a handle on said conventional shopping cart, said partition means comprising a depending member disposed on a forward edge thereof and shaped for partially encircling a basket wire proximate said handle;

means, mounting said partition means to a movable, generally vertical divider disposed within said conventional shopping cart, for enabling said partition means to be stored in a parallel relationship with the divider and lifted to a position extending between the divider and the shopping cart handle, said means mounting said partition member including bracket means, disposed on a back side of said partition means, for enabling the partition means to slide in a general vertical direction relative to the divider from a storage position at which the partition means is on a front side of the divider to a storage position at which the partition means is on a back side of the divider; and latch means for temporarily locking said partition means between the divider and the handle in order to provide a secure bin proximate said handle for temporary storage of a purse, said latch means comprising a tab slidably mounted to said depending member and extending therethrough, said tab having a lower portion shaped for partially encircling said basket wire proximate said handle when the tab is slid to a locked position and upper portion means, accessible from a top side of said depending means, for enabling sliding of said lower portion into the locked position.

2. The shopping basket accessory according to claim 1 further comprising means for displaying one of a store directory and advertisement.

3. The shopping basket accessory according to claim 2 wherein said means for displaying comprises a transparent means releasably mounted to a top side of said partition means.

4. The shopping basket accessory according to claim 3 further comprising means for holding store coupons.

5. The shopping basket accessory according to claim 4 further comprising means, mounting said basket means to said partition means, for enabling installation of the partition means on conventional shopping baskets having different widths.

6. In a conventional shopping cart having a handle, wheels mounted to a wire basket and a generally vertical wire divider disposed within said wire basket and movable to a spaced apart position from said handle to define, in combination with a wire bottom connected thereto, an elevated bin within said wire basket proximate said handle, the improvement comprising:

partition means for both covering the elevated bin and providing a solid writing surface proximate the handle of said conventional shopping cart, said partition means including a depending member disposed on a forward edge thereof and shaped for partially encircling a basket wire proximate said handle;

means, mounting said partition means to the movable, generally vertical divider, for enabling said partition means to be stored in a parallel relationship with the divider and lifted to a position extending between the divider and the shopping cart handle, said means mounting said partition means including bracket means, disposed on a back side of said partition means, for enabling the partition means to slide in a general vertical direction relative to the divider from a storage position at which the partition means is on a front side of the divider to a storage position at which the partition means is on a back side of the divider; and latch means for temporarily locking said partition means between the divider and the handle in order to provide a secure bin proximate said handle for temporary storage of a purse said latch means including a tab slidably mounted to said depending member and extending therethrough, said tab having a lower portion shaped for partially encircling said basket wire proximate said handle when the tab is slid to a locked position and upper portion means accessible from a top side of said depending member, for enabling sliding of said lower portion into the locked position.

* * * * *